(12) United States Patent
Yuan et al.

(10) Patent No.: US 11,905,213 B2
(45) Date of Patent: Feb. 20, 2024

(54) ULTRA-HIGH PERFORMANCE CONCRETE WITH WASTE BRICK POWDER AND PREPARATION METHOD AND APPLICATION THEREOF

(71) Applicant: Zhengzhou University, Zhengzhou (CN)

(72) Inventors: Chengfang Yuan, Zhengzhou (CN); Hu Feng, Zhengzhou (CN); Ali Raza, Zhengzhou (CN); Lei Shen, Zhengzhou (CN); Yanan Sun, Zhengzhou (CN); Changjiu Zhang, Zhengzhou (CN); Baoliang Wang, Zhengzhou (CN); Xiaohan Wu, Zhengzhou (CN); Na Chen, Zhengzhou (CN); Gangzhu Sun, Zhengzhou (CN)

(73) Assignee: ZHENGZHOU UNIVERSITY, Zhengzhou (CN)

( * ) Notice: Subject to any disclaimer, the term of this patent is extended or adjusted under 35 U.S.C. 154(b) by 0 days.

(21) Appl. No.: 18/340,924

(22) Filed: Jun. 26, 2023

(65) Prior Publication Data

US 2023/0416147 A1    Dec. 28, 2023

(30) Foreign Application Priority Data

Jun. 27, 2022  (CN) .......................... 202210740498.X

(51) Int. Cl.
| | | |
|---|---|---|
| *C04B 18/16* | (2023.01) | |
| *C04B 18/08* | (2006.01) | |
| *C04B 18/14* | (2006.01) | |
| *C04B 14/48* | (2006.01) | |
| *C04B 7/19* | (2006.01) | |
| *C04B 28/04* | (2006.01) | |
| *C04B 24/26* | (2006.01) | |
| *C04B 20/02* | (2006.01) | |
| *C04B 103/32* | (2006.01) | |
| *C04B 103/30* | (2006.01) | |

(52) U.S. Cl.
CPC ................ *C04B 18/16* (2013.01); *C04B 7/19* (2013.01); *C04B 14/48* (2013.01); *C04B 18/08* (2013.01); *C04B 18/146* (2013.01); *C04B 20/026* (2013.01); *C04B 24/2664* (2013.01); *C04B 28/04* (2013.01); *C04B 2103/302* (2013.01); *C04B 2103/32* (2013.01)

(58) Field of Classification Search
CPC ........... C04B 18/16; C04B 7/19; C04B 14/48; C04B 18/08; C04B 18/146; C04B 20/026; C04B 24/2664; C04B 28/04; C04B 2103/302; C04B 2103/32
See application file for complete search history.

(56) References Cited

FOREIGN PATENT DOCUMENTS

| CN | 110642582 A | * | 1/2020 | ........... C04B 12/005 |
| WO | WO-2021164794 A1 | * | 8/2021 | ............. C04B 28/08 |

* cited by examiner

*Primary Examiner* — Anthony J Green
(74) *Attorney, Agent, or Firm* — Stuart H. Mayer; Kaplan, Breyer, Schwarz LLP

(57) ABSTRACT

An ultra-high performance concrete (UHPC) with waste brick powder and preparation method and application thereof are provided, which relates to the technical field of concrete. The preparation method includes the following steps: stimulating activity of a brick powder by a method of mechanically stimulating activity to obtain waste brick powder; and preparing UHPC according to a mass ratio of cement to waste brick powder of 5:5-7:3 to obtain the UHPC with waste brick powder. The UHPC is prepared by treating waste bricks from construction waste (mechanically stimulating activity) to make waste brick powder with activity, therefore partially replacing cement. The UHPC is applied in a construction field.

6 Claims, 24 Drawing Sheets

ULTRA-HIGH PERFORMANCE CONCRETE WITH WASTE BRICK POWDER AND PREPARATION METHOD AND APPLICATION THEREOF

CROSS-REFERENCE TO RELATED APPLICATIONS

This application claims priority to Chinese Patent Application No. 202210740498.X, filed on Jun. 27, 2022, the contents of which are hereby incorporated by reference.

TECHNICAL FIELD

The present application relates to the technical field of concrete, and in particular to an ultra-high performance concrete with waste brick powder and a preparation method and application thereof.

BACKGROUND

The annual production of construction waste is increasing year by year, but the utilization rate of which remains less than 10%, among which the waste bricks constitute 30% to 40% of the construction waste. Currently, the reuse of waste bricks and concrete is mainly carried out by sorting the solid waste and using crushers to break it into recycled aggregates for reapplication as concrete or for use in road subgrade filling and building bedding.

However, the recycled aggregate requires a special process in order to be used in preparing concrete given its large porosity, internal cracks, high water absorption, and complex structure, which invariably increases the cost. Moreover, the strength of the bricks themselves is small, and the crushed bricks as aggregate added to the concrete will inevitably cause a decrease in the strength of recycled concrete. And a large amount of powder will be produced when solid waste is smashed, which contributes to a certain degree of reducing the utilization rate of construction waste as the powder is not effectively used.

Ultra-high performance concrete (UHPC) has the characteristics of high strength and long durability, but the development of UHPC is restricted by the large amount of cementitious materials, high costs and high energy consumption during preparation. The cement used in manufacturing 1 cubic meter ($m^3$) of UHPC is capable of producing 2-3 $m^3$ of ordinary concrete, and a large amount of cement used in preparing UHPC is not hydrated but only filled, while a large amount of cement leads to significantly early shrinking and easy cracking of UHPC components, which impairs the safety and service life of the components.

Therefore, it is important for the field of concrete preparation to propose a UHPC preparation method, which reduces the amount of cement used in preparing UHPC while ensuring the strength of UHPC.

SUMMARY

It is an objective of the present application to provide an ultra-high performance concrete (UHPC) with waste brick powder and its preparation method and application, so as to solve the above-mentioned problems of the prior art. Using the waste brick powder out of waste bricks to replace part of the cement, the amount of cement used is substantially reduced while ensuring the strength of UHPC, and the construction waste is recycled at the same time.

To achieve the above objective, the present application provides the following technical schemes:
one of the technical schemes of the present application provides a preparation method of a UHPC with waste brick powder, including the following steps:
stimulating activity of a brick powder by a method of mechanically stimulating activity to obtain waste brick powder; and
preparing UHPC according to a mass ratio of cement to waste brick powder of 5:5-7:3 to obtain the UHPC with waste brick powder.

Optionally, the method of mechanically stimulating activity specifically includes stimulating the activity of the brick powder by using a ball mill to ball mill brick powder with a particle size of 8-75 micrometers (μm) for 45 minutes (min) at a rate greater than 45 revolutions per minute (r/min).

Optionally, a method for preparing the waste brick powder includes following steps:
(1) crushing sun-dried waste bricks into fine particles;
(2) performing primary ball milling to the sun-dried waste bricks crushed into fine particles using a ball miller for a ball milling duration of 15 min, and obtaining brick powder;
(3) sieving the brick powder after ball milling, and selecting microfine particles with a particle size of 0.075 millimeter (mm); and
(4) using the method of mechanically stimulating activity (with a ball milling rate of 48 r/min and a duration of 45 min, performing activity stimulation on the brick powder (stimulating the activity of the brick powder) selected with the particle size of 8-75 μm, and then obtaining a waste brick powder with stimulated activity.

Optionally, in parts by mass, raw materials of the UHPC with waste brick powder include 35-42 parts of cement, 28-35 parts of brick powder, 10 parts of fly ash, 20 parts of silica fume, 100 parts of grit, 15.6 parts of steel fiber, 30 parts of water reducing agent and 17 parts of water; and
a total amount of the brick powder and the cement is 70 parts.

Optionally, the cement is P·O52.5 ordinary portland cement.

Optionally, the fly ash is first-grade fly ash.

Optionally, the steel fiber is copper plated steel fiber.

Optionally, the water reducing agent is polycarboxylate superplasticizer, and a water reducing rate of the water reducing agent is greater than 30%.

Another technical scheme of the present application is a UHPC with waste brick powder prepared by using the above-mentioned preparation method.

Another technical scheme of the present application provides an application of the UHPC with waste brick powder in the construction field.

The present application achieves the following technical effects:

Firstly, the present application makes waste brick powder with activity by processing (mechanically stimulating the activity) the waste bricks in construction waste and partially replaces cement to prepare UHPC, which effectively solves the current problem of requiring a large amount of cement for preparing UHPC while ensuring the strength of UHPC, and realizes the recycled use of construction waste;

Secondly, the present application uses waste brick powder to replace cement, saving 280 kilograms (kg) as preparing 1 $m^3$ of UHPC, reducing production costs and realizing "low carbon" concrete production;

Thirdly, the 28-day (28 d) compressive strength of the UHPC with waste brick powder (UHPC with waste brick powder) prepared by using the present application reaches about 150 megapascals (MPa), which meets the strength requirements of the relevant Chinese domestic specifications for UHPC; the bending toughness of the UHPC with waste brick powder far exceeds that of the UHPC of the benchmark group, with toughness indices $I_5$, $I_{10}$ and $I_{20}$ reaching 8, 22 and 38 respectively, also exceeding that of other UHPC in China, such as the UHPC prepared by LI Chuanxi et al. with a compressive strength of 138 MPa and bending toughness values of $I_5$, $I_{10}$ and $I_{20}$ of 3, 8 and 18 correspondingly, as well as the concrete with a compressive strength of 134 MPa and bending toughness values of $I_5$, $I_{10}$ and $I_{20}$ of 4, 9 and 20 respectively; the tensile strength of the UHPC with waste brick powder prepared by the present application is about 8 MPa, which meets the specification design requirements, and the tensile strain reaches $3,000 \times 10^{-6}$, indicating good strain hardening characteristics; the shrinkage of the UHPC with waste brick powder prepared according to the present application is smaller than that of ordinary UHPC, with an early autogenous shrinkage of only about $848 \times 10^{-6}$ and a drying shrinkage of only about $470 \times 10^{-6}$ at 56 d, representing a relatively small overall shrinkage; and Lastly, the pores inside the UHPC are optimized by replacing cement with waste brick powder, which reduces the porosity; and the brick powder participates in the secondary hydration reaction and fills the pores inside the material, and the most probable aperture of the material is around 5 nano-meters (nm) measured by the mercury pressure test.

BRIEF DESCRIPTION OF THE DRAWINGS

For a clearer description of the technical schemes in the embodiments of the present application or in the prior art, the drawings to be used in the embodiments are briefly described below, and it is obvious that the drawings in the following description are only some embodiments of the present application, and other drawings are available to those of ordinary skill in the art without creative effort.

DETAILED DESCRIPTION OF THE EMBODIMENTS

Various exemplary embodiments of the present application are described in detail, which shall not be considered as a limitation of the present application, but shall be understood as a rather detailed description of certain aspects, characteristics and embodiments of the present application.

It should be understood that the terms described in the present application are only intended to describe particular embodiments and are not intended to restrict the present application. In addition, for the numerical range of the present application, it shall be understood that each intermediate value between the upper and lower limits of the range is also specifically disclosed. The median value within any stated value or range and each smaller range between any other stated value or the median value within the range are also included in the present application. Upper and lower limits of these smaller ranges may be independently included or excluded from the range.

Unless otherwise stated, all technical and scientific terms used herein have the same meaning as generally understood by a person skilled in the art of the present application. Although the present application describes only preferred methods and materials, any methods and materials similar or equivalent to those described herein may be used in the implementation or testing of the present application. All literature referred to in this specification is incorporated by reference to disclose and describe methods and/or materials related to the literature. In the event of a conflict with any incorporated literature, the contents of this specification shall prevail.

On the premise of not deviating from the design spirit of the present application, a variety of improvements and changes can be made to the specific mode of implementation of the specification of the present application, which is obvious to the technical personnel in this field. Other embodiments derived from the specification of the present application are obvious to the technician. The specification and embodiments of the present application are illustrative only.

The terms "comprise", "include", "have" and "involve" used in this specification are all open terms, which means including but not limited to.

The "parts" mentioned in the present application shall be considered as in parts by mass unless otherwise specified.

The present application relates to the following tests:

(1) Cube Compressive Strength Test

Figure 1:
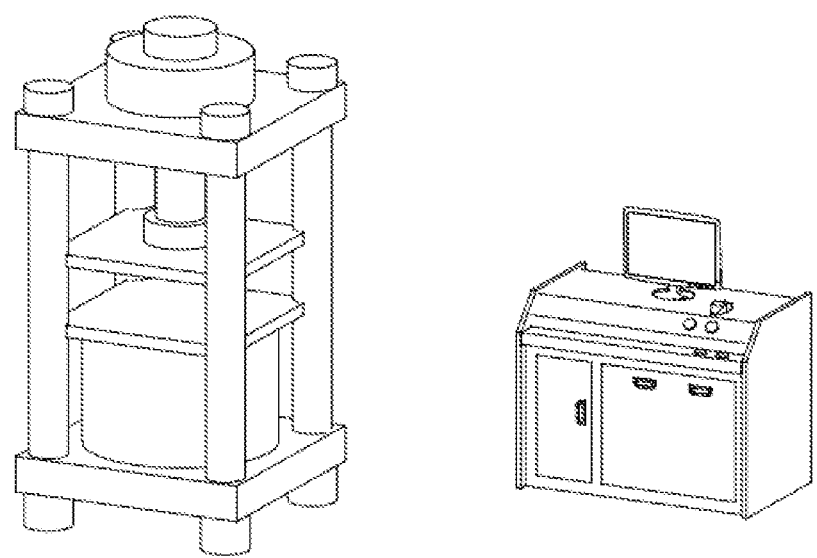
FIG. 1 is a photograph of an instrument used in a cube compressive strength test of the present application.
Figure 2:
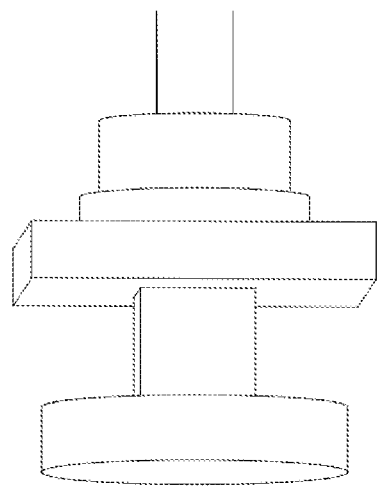
FIG. 2 is a loading picture of the cube compressive strength test of present application.

The cube compressive strength test is conducted in accordance with the specification "Technical requirements for ultra-high performance concrete (UHPC)" (T/CECS 10107-2020) and the specification "Standard for test methods of concrete physical and mechanical properties" (GB/T 50081-2019). The test adopts YAW-3000 electro-hydraulic pressure tester (as shown in FIG. 1), with a range of 0-3,000 kilonewtons (KN), and a maximum destructive loading of the tested specimen is greater than 20% of the range of the testing machine and less than 80% of the maximum range, and the test loading is shown in FIG. 2. According to the requirements, the test specimen has a size of 100×100×100 millimeters (mm), with 6 specimens in each group, and the test loading rate is 1.2 megapascals per second (MPa/s). The cube compressive strength of the specimen of UHPC is calculated according to the equation (1):

$$f_{cc} = \frac{F}{A}, \quad (1)$$

in the equation (1): $f_{cc}$ represents the cube compressive strength of UHPC, in MPa;

F stands for a destructive loading of the specimen, in KN; and

A stands for a bearing area of the specimen, in cubic millimeter (mm$^2$).

The dimensional conversion factor of UHPC cube compressive strength is 1.0, and the result is reserved to one digit behind the decimal. The average value of the strength of 6 specimens is taken as the measured value. Where the difference between the strength value of 1 or 2 specimens and the average value is greater than 10% of the average value, the values of the specimens exceeding the average value are discarded and the average value of the remaining specimens is taken as the measured value; and where the difference between the strength value of 3 or more specimens and the average value is greater than 10% of the average value, the test is invalid and the group should be retested. A picture of the instrument used for the test is shown in FIG. 1, a YAW-3000 electro-hydraulic pressure tester, and the loading diagram of the cube compressive test is shown in FIG. 2.

(2) Bending Toughness Test

Figure 3:
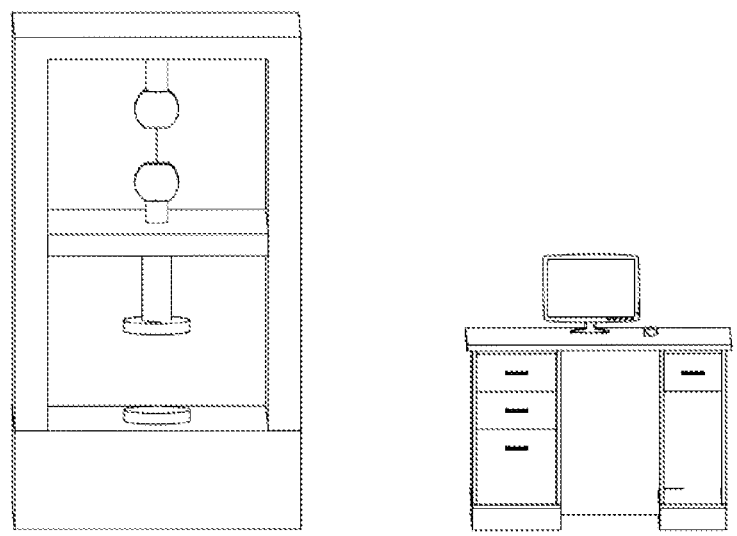
FIG. 3 is a picture of an instrument used in a bending toughness test of the present application.
Figure 4:
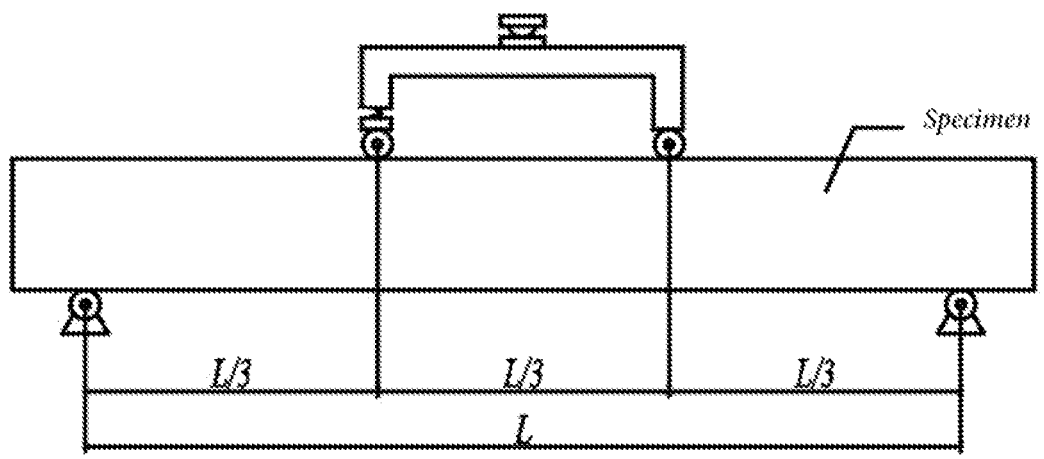
FIG. 4 is a schematic loading diagram of the bending toughness test of the present application.

The bending toughness test of UHPC is carried out in accordance with the specification "Standard test methods for fiber reinforced concrete" (CECS 13: 2009), which uses a WDW-200 electronic universal testing machine with a range of 0 to 200 KN (as shown in FIG. 3). The test is conducted on beam specimens with a cross-sectional size of 100×100 mm and a length of 400 mm, with a loading rate of 0.2 mm/min and 3 specimens in each group, the schematic diagram of the experimental loading is shown in FIG. 4.

The specimens are taken out from the curing room upon being maintained to the test age, and the surface is dried to ensure that the loading surface is flat, clean and free of defects. During the loading process, the phenomenon is observed in time, with data recorded, and the loading is stopped when the spanwise deflection value of the specimen is greater than 10.5 times the initial crack deflection or the specimen is about to be disconnected. The bending toughness relevant index of the UHPC specimen is calculated according to the following method.

Figure 5A:
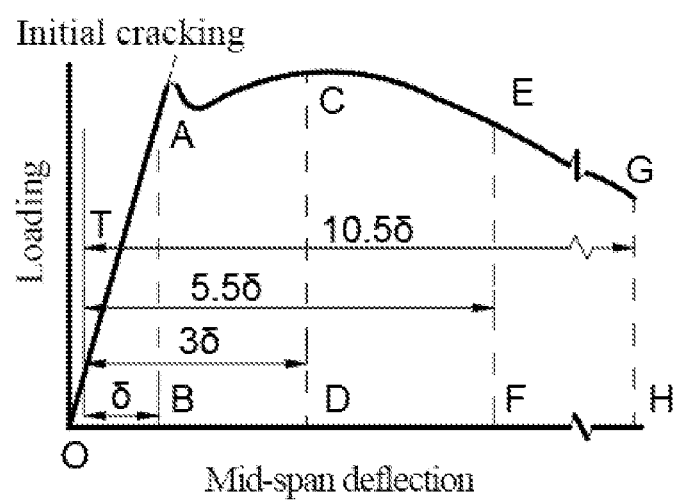
FIG. 5A shows a curve before cracking with concave surface facing up of a specimen classified according to different curve shapes before cracking.
Figure 5B:
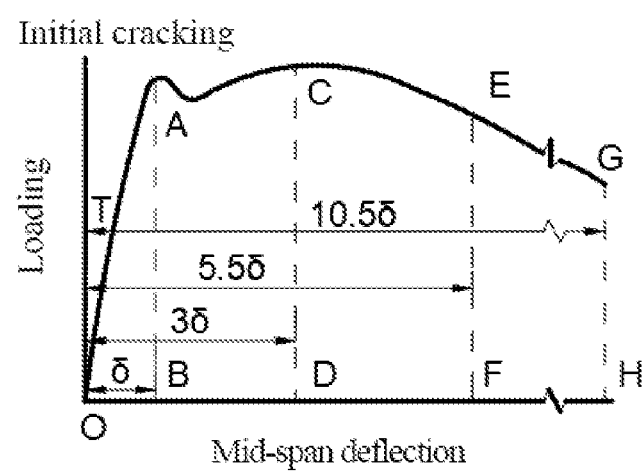
FIG. 5B shows a curve facing up before cracking of a specimen classified according to different curve shapes before cracking.

The initial crack strength of the UHPC specimen is calculated as shown in FIG. 5A and FIG. 5B (schematic diagrams of bending toughness indexes calculation), the end point of the initial linear part of the loading deflection curve or the loading abrupt change is taken as the initial cracking point A (see FIG. 5A and FIG. 5B, the vertical coordinate of point A is the initial crack loading $F_{CRA}(N)$, the horizontal coordinate is the initial crack deflection δcr, and the initial crack strength of the UHPC specimen is calculated according to equation (2), and the result is accurate to 0.1 MPa.

$$f_{cr} = \frac{F_{cr}L}{bh^2}, \quad (2)$$

in the equation (2):

$f_{cr}$ represents the initial cracking strength of UHPC, in MPa;

$F_{cr}$ represents the initial crack loading, in N;

L represents the span between tested beam supports, in mm;

b represents the section width of the specimen, in mm;

h represents the section height of the specimen, in mm.

The bending toughness index of UHPC is calculated according to the following methods:

with O as the starting point, four points A, C, E and G are determined on the load-deflection curve in accordance with 1.0, 3.0, 5.5 and 10.5 times the initial crack deflection value, and four points B, D, F and H are identified as the corresponding deflection values on the horizontal axis, and the areas of OAB, OACD, OAEF and OAGH are calculated using the integrals as Ωδ, Ω3.0δ, Ω5.5δ and Ω10.5δ respectively. Bending toughness index of each specimen is calculated according to equations (3)-(5), and the arithmetic mean of the three specimens is used as the bending toughness value of the group of specimens, and the results are retained to two decimal places.

$$I_5 = \frac{\Omega_{3.0\delta}}{\Omega_\delta} \quad (3)$$

$$I_{10} = \frac{\Omega_{5.5\delta}}{\Omega_\delta} \quad (4)$$

$$I_{20} = \frac{\Omega_{10.5\delta}}{\Omega_\delta} \quad (5)$$

The equivalent bending strength of UHPC specimen is calculated according to the following equation:

$$f_e = \frac{\Omega_k L}{bh^2 \delta_k} \quad (6)$$

in the equation (6):

$f_e$ stands for the equivalent bending strength, in MPa;

$\Omega_k$ stands for the area under the deflection curve when the mid-span deflection is 2 mm, in N·mm; and $\delta_k$ stands for the deflection value when mid-span deflection is L/150, in mm.

The bending toughness ratio of UHPC specimen is calculated according to the following equation:

$$R_e = \frac{f_e}{f_{cr}} \quad (7)$$

(3) Uniaxial Tensile Test

Figure 6A:
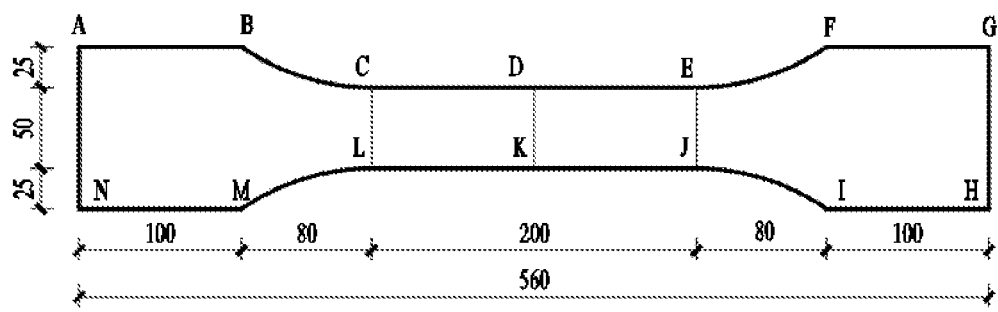
FIG. 6A is a top view picture illustrating size of a uniaxial tensile specimen of the present application.
Figure 6B:
FIG. 6B is a main view picture illustrating size of a uniaxial tensile specimen of the present application.

The uniaxial tensile test of UHPC is performed according to the tensile performance test method in the specification "Technical requirements for ultra high performance concrete (UHPC)" (T/CECS 10107-2020). The test adopts WDW-20 electronic universal testing machine with displacement control (similar to FIG. 3, with different measuring range), and a measuring range of 0-20 KN, the size of the test specimen is shown in FIG. 6A and FIG. 6B, and the thickness is determined to be 30 mm in accordance with the specification, and the schematic loading diagram is shown in FIG. 7.

Figure 7:
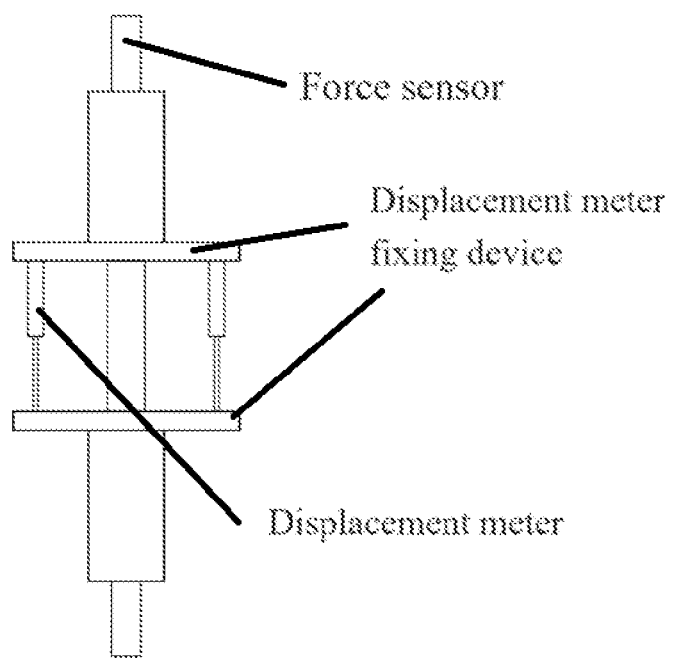
FIG. 7 is a schematic loading picture of the uniaxial tensile specimen of the present application.

The specimens are taken out from the curing room upon being maintained to the test age, the surface of the specimens is dried, with 6 specimens in each group, and the test is carried out after being assembled as shown in FIG. 7. During the test, the specimens are first pretensioned, with a pretension loading being 15%-20% of the destructive loading, and the test is carried out at a loading rate of 0.2 mm/min after the pretensioning is completed. After the test is completed, the specimens are observed for damage positions, with CE section or U section as the scale distance (as shown in FIG. 6A and FIG. 6B), and the damage positions are valid when located within the scale distance; each group should have no less than 4 valid specimens, and the group test is invalid when less than 4, and re-tests should be conducted. Uniaxial tensile performance index of UHPC specimens is calculated according to the equations (8)-(11).

The elastic ultimate tensile strength of UHPC specimen is calculated according to equation (8):

$$f_{te} = \frac{F_{te}}{A} \quad (8)$$

in the equation (8):

$f_{te}$ stands for the elastic ultimate tensile strength, in MPa, with two decimal places reserved;

$F_{te}$ stands for the loading corresponding to elastic limit point, in N; and

A stands for the middle cross-sectional area of tensile specimen, in mm².

The elastic ultimate tensile strain of UHPC specimen is calculated according to equation (9):

$$\mu_{te} = \frac{l_{te}}{L} \quad (9)$$

in the equation (9):

$\mu_{te}$ is the elastic ultimate tensile strain, in $1\times10^{-6}$;

$l_{te}$ is the deformation at elastic ultimate point, in mm; and

L is the scale distance of the tensile specimen.

The tensile elastic modulus of UHPC specimen is calculated according to the equation (10):

$$E_{te} = \frac{f_{te}}{\mu_{te}} \quad (10)$$

in the equation (10):

$E_{te}$ is the tensile elastic modulus, in gigapascals (GPa), with one decimal place reserved;

The tensile strength of UHPC specimen is calculated according to the equation (11):

$$f_{tu} = \frac{F_{max}}{A} \quad (11)$$

in the equation (11):

$f_{tu}$ is the tensile strength of UHPC specimen, in MPa, with two decimal places reserved; and $F_{max}$ is the maximum loading in the tensile test, in N.

(4) Autogenous Shrinkage

Figure 8:
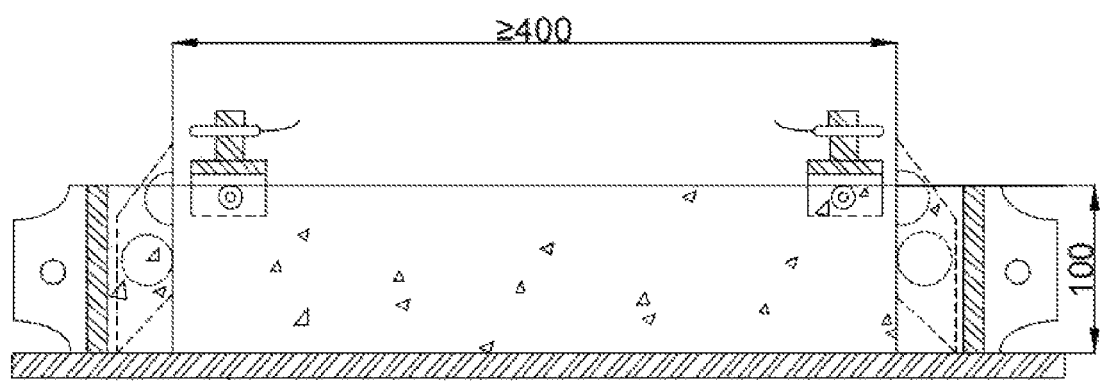
FIG. 8 is a schematic diagram of an autogenous shrinkage testing device of the present application.

The testing method for the autogenous shrinkage of UHPC with waste brick powder is carried out according to the specification "Standard for test methods of long-term performance and durability of ordinary concrete" (GB/T 50082-2009). The test uses the NEL-NES non-contact concrete shrinkage deformation tester produced by Beijing Naird Company, with the measurement principle schematic diagram as shown in FIG. 8. The test is conducted under constant temperature of 20±2 degrees Celsius (° C.) and relative humidity of 60±5% in a chamber of constant temperature and humidity.

A steel test mould with qualified stiffness is used, a layer of lubricant is painted inside the test mould, then two layers of plastic wrap are laid, and the same layer of lubricant is painted between the two layers of plastic wrap. After finishing pouring, it should be smoothed by vibration and covered with a layer of plastic wrap on the surface immediately, after which it should be moved into the chamber of constant temperature and humidity, and the test should be started after standing still for 3 hours, and the data is collected every 15 min, with the oscillation of the whole test device being avoided during the whole test process. The autogenous shrinkage rate of UHPC is calculated according to the equation (12):

$$\varepsilon_{st} \frac{(L_{10} - L_{1t}) + (L_{20} - L_{2t})}{L_0} \quad (12)$$

in the equation (12):

$\varepsilon_{st}$ is the shrinkage rate when the test is t (h), t is counted from the start of the test;

$L_{10}$ is the initial reading of the left side displacement sensor, in mm;

$L_{1t}$ is the reading of the left displacement sensor when the test time is t, in mm;

$L_{20}$ is the initial reading of the right displacement sensor, in mm;

$L_{2t}$ is the reading of the right displacement sensor when the test time is t, in mm; and $L_0$ is the measurement scale distance of the specimen, in mm, equal to the distance between two reflecting targets in the specimen.

The arithmetic mean of the test results of three specimens in each group is taken as the autogenous shrinkage value of the group tested, with a precision value of $1.0 \times 10^{-6}$.

(5) Drying Shrinkage

Figure 9:
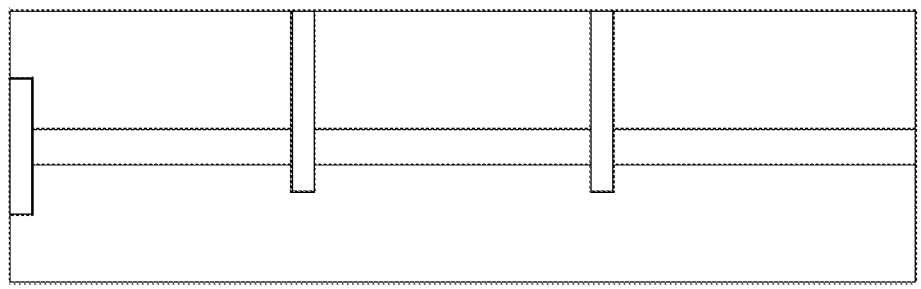
FIG. 9 is a photograph of sp-540 horizontal concrete shrinkage and expansion instrument used for drying shrinkage test of the present application.

The drying shrinkage test of UHPC with waste brick powder is conducted according to the specification "Standard for test methods of long-term performance and durability of ordinary concrete" (GB/T 50082-2009). The contact method is adopted, and the test instrument is sp-540 type horizontal concrete shrinkage and expansion instrument, as shown in FIG. 9. The test is performed in a chamber of constant temperature and humidity at a temperature of 20±2° C. and a relative humidity of 60±5%.

The specimen is covered with plastic wrap on its surface immediately after pouring and moved into the standard maintaining room to be maintained with the mould for 2 d, after which the mould is removed. The specimens are transferred into a chamber of constant temperature and humidity at a temperature of 20±2° C. and a relative humidity of 60±5% when they have reached the age of 3 d, after which the initial length is measured, and the shrinkage rate is examined at the following intervals: 1 d, 3 d, 7 d, 14 d, 28 d, 42 d, 56 d (counting from the time the specimens are transferred into the chamber of constant temperature and humidity). While testing, the instrument is first calibrated to the zero point with a standard lever, each test block is repeatedly tested for 3 times, and the arithmetic mean of the three values is taken as the shrinkage value of the specimen; for each group of three test blocks, the arithmetic mean of the shrinkage values of the three specimens is taken as the test result of the group of specimens. The drying shrinkage rate of UHPC is calculated according to the equation (13):

$$\varepsilon_{st} = \frac{L_0 - L_t}{L_b} \quad (13)$$

in the equation (13):

$\varepsilon_{st}$ is the shrinkage rate of UHPC when the test age is t (d), in $1 \times 10^{-6}$;

$L_0$ is the initial length of specimen length, in mm;

$L_t$ is the length reading of the specimen when the test age is t (d), in mm; and $L_b$ is the test scale distance of the specimen, equal to the distance between two gauge heads, in mm.

(6) Microscopic Test

Figure 10:
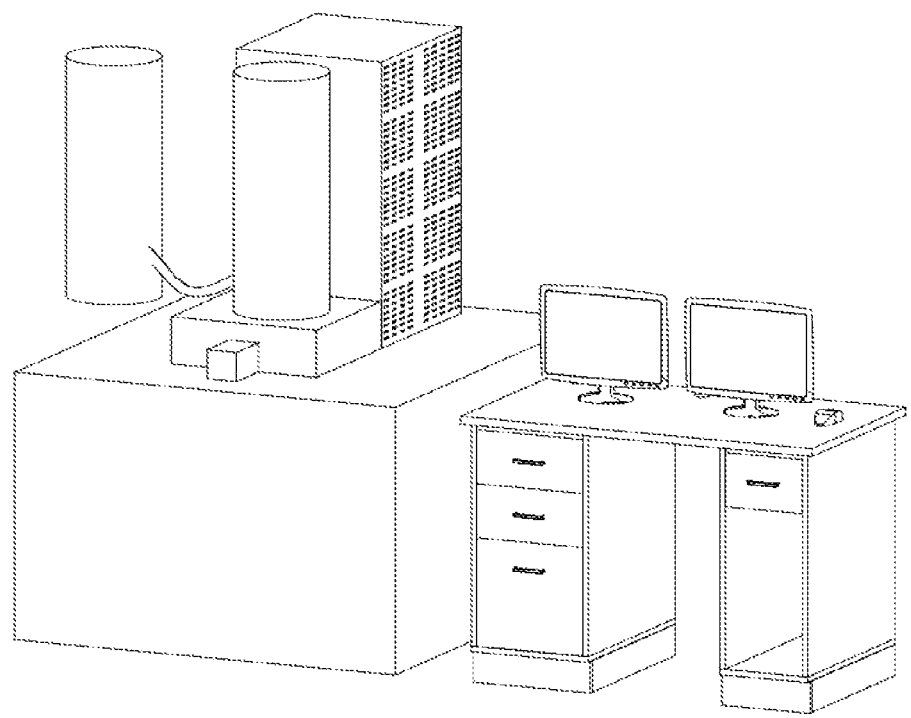
FIG. 10 is a photograph of a scanning electron microscope used in a microscopic test of the present application.

Field emission scanning electron microscopy (SEM) tests are performed on cement, waste brick powder, and damaged specimens to analyze their microscopic morphology. The samples are dried in a vacuum drying oven at 50° C. for 1 h before the experiment to prevent the reaction of the samples with moisture and carbon dioxide in the air. The SEM test is performed using a Hitachi S-4800 high-resolution cold field emission scanning electron microscope (see FIG. 10) produced by Hitachi, Japan, with a specimen magnification of 50,000 times or less.

Figure 11:
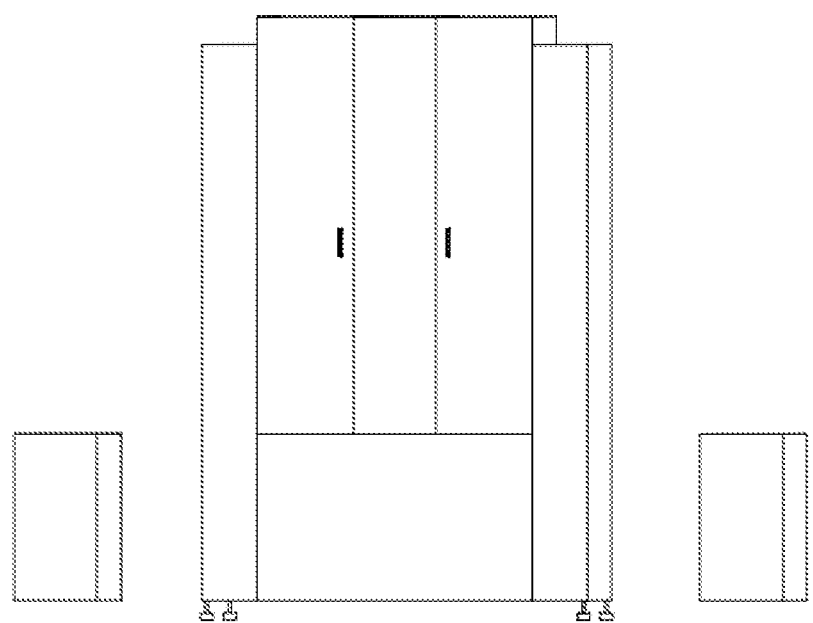
FIG. 11 is a photograph of an X-ray powder diffractometer used in the present application.

The waste brick powder and UHPC pure paste test blocks are placed in a vacuum drying oven and dried at 50° C. for 24 h, and subsequently taken out and ground into powder. The prepared powder materials are sifted through a 75-μm round-hole sieve, after which they are immediately sealed and stored. The prepared powder materials are tested by X-ray polycrystalline diffraction (XRD) analysis using ULTIMA IV X-ray powder diffractometer (see FIG. 11) produced by Rigaku Corporation, Japan, to analyze the chemical composition of the UHPC specimens and brick powder and to investigate the reaction mechanism of the cementitious materials inside the UHPC specimens in depth.

Figure 12:
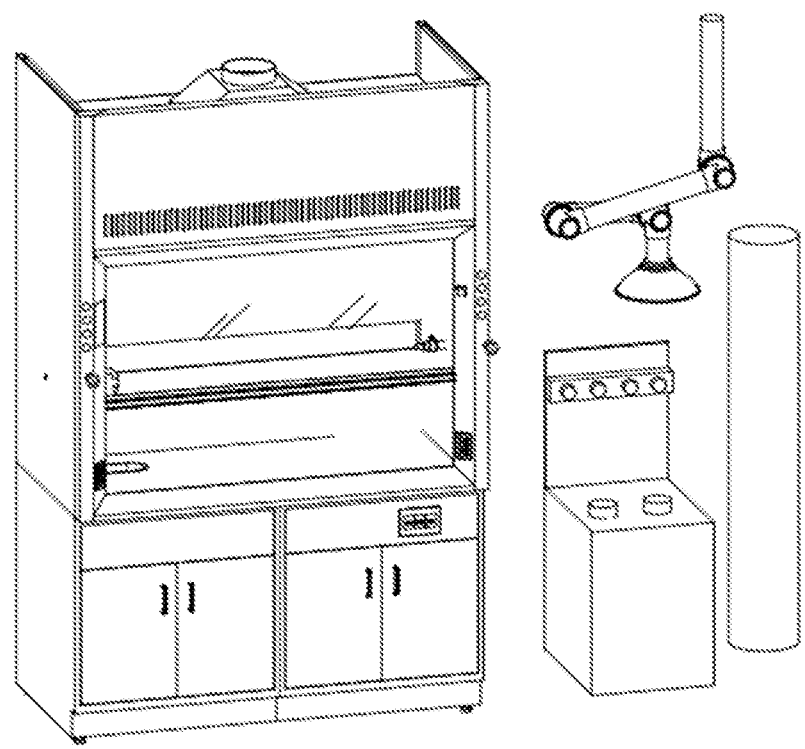
FIG. 12 is a photograph of an automatic mercury injection instrument AutoporeIV9500 used in the present application.

The Autopore IV 9500 fully automatic mercury piezometer (see FIG. 12) from Mack Corporation, USA, is used to conduct test of Mercury Intrusion Porosimetry (MIP) on the UHPC substrate specimens, and the specimens with a side length of about 10 mm are taken and dried in a vacuum drying oven at 50° C. for 24 h before being sealed immediately. The pore structure inside the UHPC is analyzed by the test of MIP, and the apparent density, porosity, and the content of each rank of aperture are tested to investigate the mechanism of the action of waste brick powder from the aspect of microscopic pores.

The production of the specimen of the present application is as follows:

(1) Stirring

Figure 13:
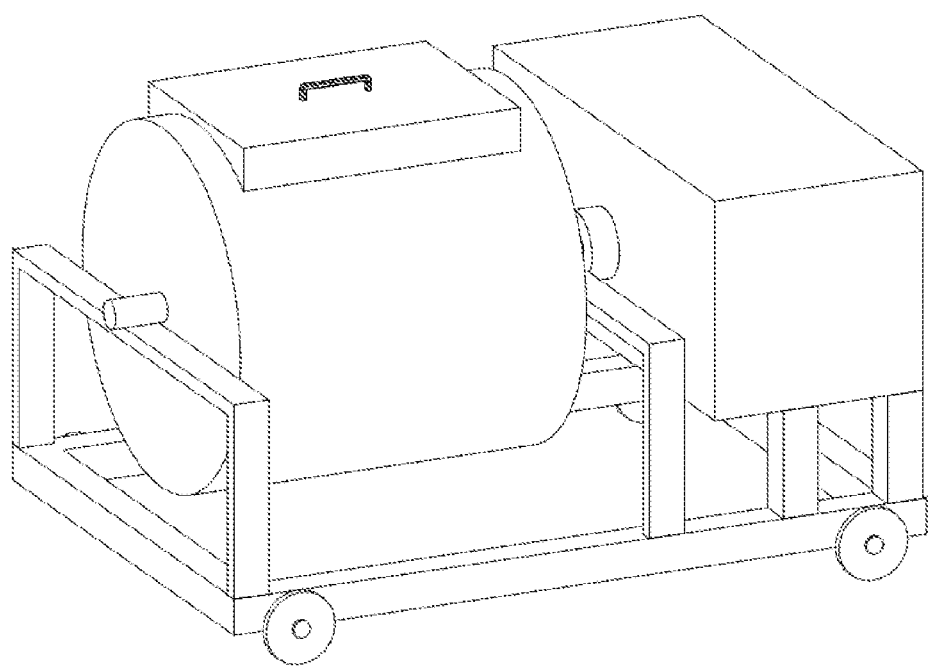
FIG. 13 is a photograph of a forced mixer used in the present application.
Figure 14:
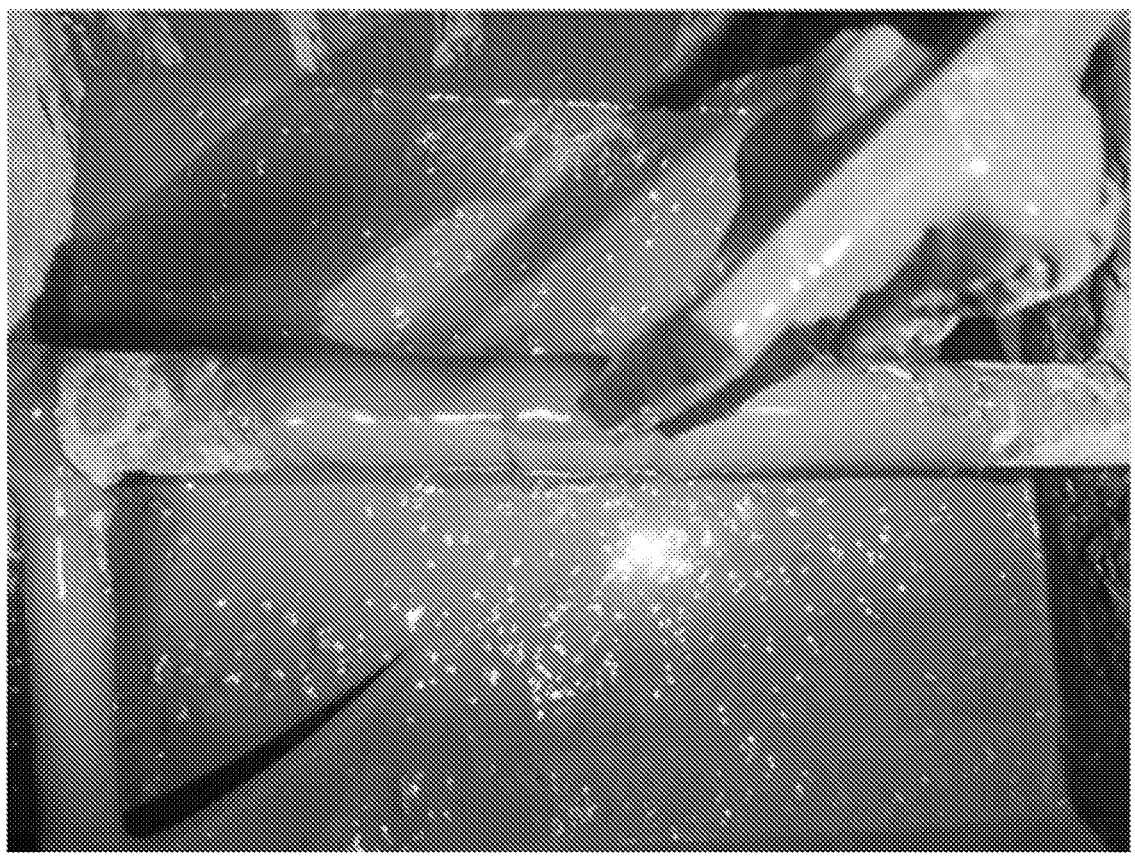
FIG. 14 is a photograph of materials stirred to sticky state during a preparation of a specimen of the present application.

During preparation, UHPC is stirred by a forced mixer (as shown in FIG. 13) in the following order:

① firstly, cement, brick powder, fly ash, silica fume, powdered water reducer and other powder materials are mixed dryly for 2-3 minutes (min);

② all the water is added and stirred for 3-5 min until the material is thick as shown in FIG. 14;

③ the stirring is continued, and the grit is added slowly during the stirring process, this process should take about 1 min, after all the grit is added, the stirring is continued for 2 min; and ④ the steel fiber is added while stirring, and after all the fiber is added, the stirring is continued for no less than 2 min until the fiber is dispersed evenly in the mixture.

(2) Moulding

After the stirring is completed, the mixture is poured into the clean test mould from one side and the pouring is completed at one time, then the surface is gently smoothed with a spatula, after which the side wall of the test mould is gently tapped with a rubber hammer, etc., and then placed on a vibrating table and vibrated for about 15 s. After pouring, the surface is covered with plastic wrap immediately to prevent moisture loss inside UHPC, and the mould is moved into a room with relative humidity greater than 50% and temperature of 20±5° C. for standing. The specimen size of compressive strength test is 100×100×100 mm, 6 pieces per group; the specimen size of bending toughness test is 100×100×400 mm, 3 pieces per group; the specimen size of uniaxial tensile test is shown in FIG. 6A and FIG. 6B, 6 pieces per group; the specimen size of autogenous shrinkage and drying shrinkage is 100×100×515 mm.

(3) Maintenance

The specimens for mechanical properties are rested in the room with relative humidity greater than 50% and temperature of 20±5° C. for 1-2 d and then demolded, then placed in the fast maintenance box with steam and heated up to 90° C. at the rate of 15° C./h, with constant temperature kept for 48 h, and then cooled down to room temperature at the rate of 15° C./h. After the standard steam curing, the specimens are placed in the standard maintenance room and maintained to the age specified in the test.

The autogenous shrinkage specimens are moved into the chamber of constant temperature and humidity at a temperature of 20±2° C. and relative humidity of 60±5% after molding, and stand still for 3 h to start the test. The dry shrinkage specimens are covered with plastic wrap on the surface immediately after pouring and moved into the standard maintenance room with moulds and maintained for 2 d, after which the moulds are removed. When the specimen reaches the age of 3 d, it should be moved into the chamber of constant temperature and humidity with the temperature of 20±2° C. and relative humidity of 60±5%.

Embodiment 1 Preparation of Waste Brick Powder (1) The waste bricks in the construction waste are sorted, dried and preliminarily crushed into fine particles by a jaw crusher;
(2) SM500×500 ball miller is used for the primary ball milling, with a ball milling duration of 15 min;
(3) the brick powder after ball milling is screened, and the microfine particles with a particle size of 0.075 mm are selected;
(4) the activity of the selected brick powder with the particle size of 0.075 mm is stimulated (stimulating the activity of the brick powder) by the method of mechanically stimulating activity (SM500×500 ball miller at 48 r/min, ball milling for 45 min), then the waste brick powder with stimulated activity is obtained.

Embodiment 2 Preparation of UHPC with Waste Brick Powder

The waste brick powder prepared in Embodiment 1 is replaced by 40% of cement to prepare the UHPC with waste brick powder, denoted as UHPC with waste brick powder (Group: R), and the proportioning is shown in Table 1.

A benchmark group is set and denoted as benchmark UHPC (group: B)

The difference between the benchmark group and the UHPC waste brick powder only lies in the omission of the addition of waste brick powder, and the proportioning is shown in Table 1.

TABLE 1

Proportioning of UHPC with waste brick powder (kg/m³)

| Group | Cement | Brick powder | Fly ash | Silica fume | River sand | Steel fiber | Water reducing agent | Water |
|-------|--------|--------------|---------|-------------|------------|-------------|---------------------|-------|
| B | 700 | 0 | 100 | 200 | 1,000 | 156 | 30 | 170 |
| R | 420 | 280 | 100 | 200 | 1,000 | 156 | 30 | 170 |

The cements used in Table 1 are all P·O52.5 ordinary silicate cements. The fly ash is all first-grade fly ash. The steel fibers are straight and smooth ordinary copper-plated steel fibers with diameter of 0.2 mm and length of 12 mm and tensile strength of over 2, 000 MPa. The water reducing agent is polycarboxylate superplasticizer water reducing agent with water reduction rate of over 30%. The water is clean and pollution-free normal tap water.

The performance of the two groups of UHPC in Embodiment 2 is tested, and the results are as follows:

(1) Compressive Strength Test

The compressive strength test results of the two groups of UHPC are shown in Table 2.

TABLE 2

Results of compressive strength test

| Group | Replacement rate of waste brick powder/% | Average compressive strength/MPa | | | |
|-------|------------------------------------------|------|------|------|------|
| | | 3 d | 7 d | 14 d | 28 d |
| B | 0 | 152.1 | 155.3 | 156.4 | 160.0 |
| R | 40 | 131.8 | 136.7 | 142.2 | 149.6 |

As can be seen from the Table 2, the compressive strength of UHPC is reduced by replacing cement with brick powder, and the compressive strength of waste brick powder UHPC can still reach 130 MPa at the age of 3 d, still satisfying the current domestic requirements for compressive strength of UHPC. At the age of 3 d, the compressive strength of group R is reduced by 15.4% compared to that of group B. At the age of 28 d, the compressive strength of group R is reduced by 6.5% compared to that of group B, indicating that the compressive strength decreases with age. The difference of compressive strength is shortened as the age increases, and the 28 d compressive strength of UHPC with waste brick powder can reach about 150 MPa.

(2) Bending Toughness Test

Figure 15:
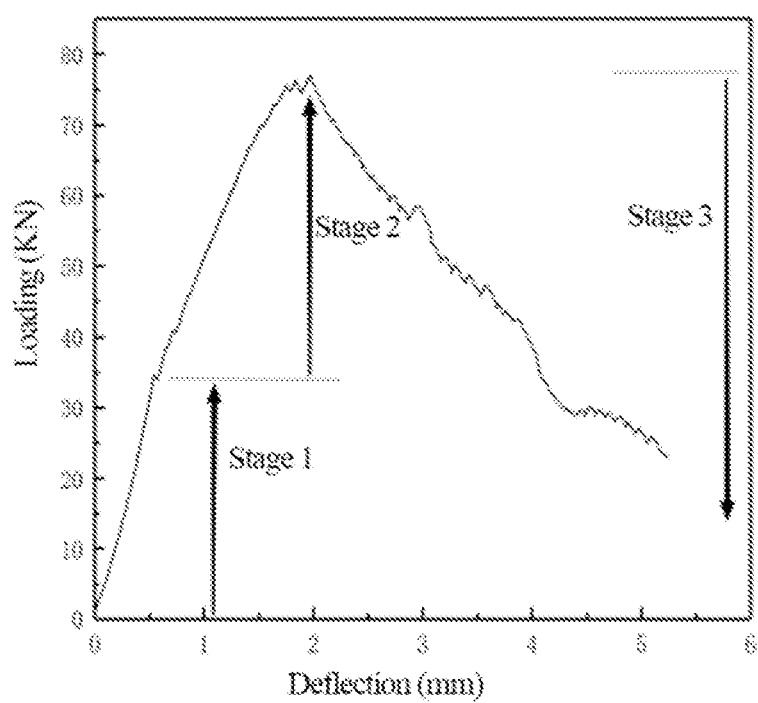
FIG. 15 shows a bending toughness load-deflection curve of an ultra-high performance concrete (UHPC) with waste brick powder prepared in Embodiment 2.

The load-deflection curve in the bending toughness test of UHPC with waste brick powder is shown in FIG. 15, and the load-deflection curve is divided into three stages: ① from the beginning of the test to the stage before the initial cracking, the UHPC substrate bears most of the stress during this stage, the curve has a large slope and is linearly elastic and the material has a high flexural stiffness; ② when the bending load exceeds a certain value, there is a partial "steep drop" in the loading value above the curve, or the curve deviates from the linear phase, at this time the extremely small cracks begin to appear in the lower part of the specimen, which are almost unobservable to the naked eye, the stress inside the specimen is borne by the UHPC substrate and the steel fibers together, with the increase of the bending load, the load fluctuates occasionally on the curve, the slope of the curve decreases, the bending stiffness of the specimen also becomes smaller, and the cracks gradually become larger until the ultimate load is reached; ③ the loading slowly decreases from the peak, at this time the cracks in the lower part of the specimen continue to expand and extend, the stress inside the specimen is mainly borne by the steel fibers, along with the "clicking" sound, the steel fibers around the cracks continue to be pulled out, the load-deflection curve constantly appears the phenomenon of loading floating up and down. After the initial cracking of the specimen, the load can still grow to about twice the initial crack loading, which proves that the material still has a good load-bearing capacity after the initial cracking.

Table 3 shows the calculation results of the bending toughness related indexes of UHPC with waste brick powder and benchmark UHPC

TABLE 3

Calculation results of bending toughness indexes of the two groups of specimens

| Group | Initial crack loading $F_{cr}$/KN | Initial crack deflection $\delta$/mm | Resistance to initial cracking $f_{cr}$/Mpa | Ultimate load F/KN | I5 | $I_{10}$ | $I_{20}$ | Equivalent bending strength $f_e$/MPa | Bending toughness ratio $R_e$ |
|---|---|---|---|---|---|---|---|---|---|
| B | 45.532 | 0.709 | 13.660 | 77.965 | 7.185 | 11.822 | 13.935 | 15.323 | 1.122 |
| R | 35.192 | 0.545 | 10.558 | 94.727 | 8.569 | 22.507 | 38.169 | 15.862 | 1.502 |

As can be seen from Table 3, the initial crack loading and initial crack deflection of the UHPC with waste brick powder are lower than that of the benchmark UHPC, and the initial crack loading and initial crack deflection are mainly borne by the substrate. The decrease of compressive strength indicates that the substrate strength of the UHPC with waste brick powder is lower than that of the benchmark UHPC, but the increase of the ultimate load of group R indicates that the ultimate bearing capacity of the waste brick powder is better than that of the benchmark UHPC. Compared with group B, the toughness indexes of group R, $I_5$, $I_{10}$ and $I_{20}$, are increased significantly. The bending toughness of UHPC with waste brick powder is much better than that of the benchmark UHPC.

(3) Uniaxial Tensile Test

Figure 16:
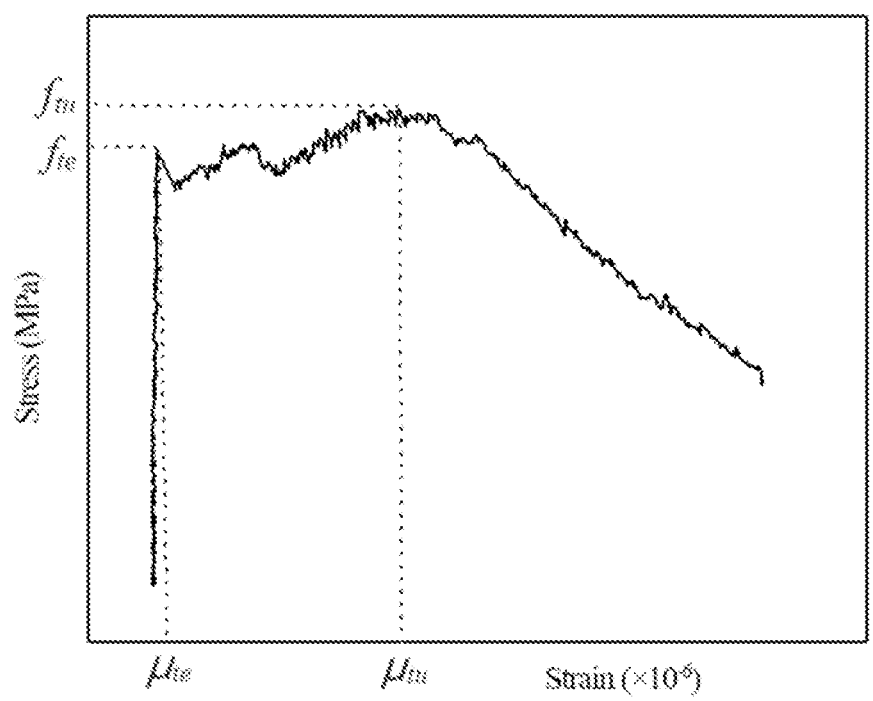
FIG. 16 shows a stress-strain curve of UHPC with waste brick powder prepared in Embodiment 2 in a uniaxial tensile test.
Figure 17:
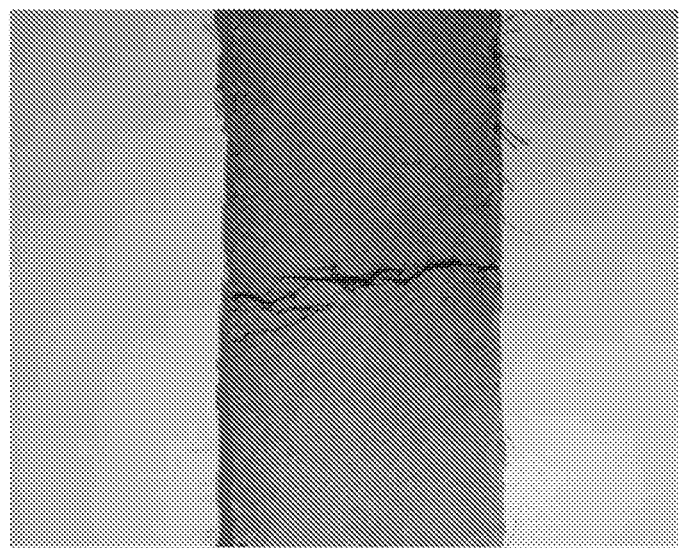
FIG. 17 is a photograph showing a damage morphology of a specimen prepared from the UHPC with waste brick powder of Embodiment 2 in the uniaxial tensile test.

A typical stress-strain curve in a tensile test of UHPC with waste brick powder is shown in FIG. 16. The stress-strain curve of UHPC with waste brick powder under uniaxial tensile loading is divided into three stages: ① the linear elastic stage, before the initial cracking load is reached, the stress and strain are in a linear relationship, the stress-strain curve is approximately a straight line, the specimen is deformed elastically at this stage and the stress in the specimen is mainly borne by the substrate; ② the strain hardening stage, after the strain of the specimen exceeds the elastic ultimate strain, the stress in the specimen has a small "jump", as the strain continues to increase, the steel fibers play an active role in the specimen, the stress in the specimen slowly increases, and the phenomenon of stress redistribution occurs continuously, at this time the cracks on the surface of the specimen gradually become clear, with the stress inside the material being shared by the steel fibers and the substrate; and ③ the strain softening stage, after exceeding the tensile strain, the stress slowly decreases as the strain increases and the stress-strain curve is linearly sawtooth shaped, indicating that the steel fibers are continuously slipping and the cracks within the specimen are expanding and reaching a certain limit until the load bearing capacity is destroyed and the test is stopped. The damage pattern of the specimen is illustrated in FIG. 17, where the largest crack is accompanied by several tiny cracks that are zig-zagged and uneven, proving that the steel fibers play an active role. In FIG. 16, $f_{te}$ is the elastic ultimate tensile strength, $\mu_{te}$ is the elastic ultimate tensile strain, $f_{tu}$ is the tensile strength, and $\mu_{tu}$ is the ultimate strain corresponding to the tensile strength.

Table 4 shows the calculation results of related indexes of uniaxial tensile properties of UHPC with waste brick powder and benchmark UHPC.

TABLE 4

Tensile properties of the two groups of specimens

| Group | Elastic ultimate tensile strength $f_{te}$/MPa | Elastic ultimate strain $\mu_{te}/\times 10^{-6}$ | Tensile modulus of elasticity $E_{te}$/GPa | Tensile strength $f_{tu}$/MPa | Tensile strain $\mu_{tu}/\times 10^{-6}$ |
|---|---|---|---|---|---|
| B | 5.89 | 390 | 15102.0 | 6.13 | 975 |
| R | 6.48 | 88 | 73636.4 | 6.67 | 3045 |

As can be seen from the Table 4, the uniaxial tensile property of UHPC with waste brick powder was good, and its tensile strength was greater than that of the benchmark group UHPC. The ultimate strain of the UHPC with waste brick powder at the elastic stage was small, and its tensile modulus and tensile strain are much higher than that of the benchmark group UHPC. It is proved that the preparation of UHPC by brick powder instead of cement has a good optimization effect on its uniaxial tensile property. The uniaxial tensile properties of the UHPC with waste brick powder are good and the tensile strength is greater than that of the benchmark UHPC. The ultimate strain in the elastic phase of the UHPC with waste brick powder is smaller and the tensile modulus and tensile strain are much higher than that of the benchmark UHPC, demonstrating that the uniaxial tensile properties of the UHPC with brick powder replaced by cement are well optimized.

(4) Autogenous Shrinkage

Figure 18:
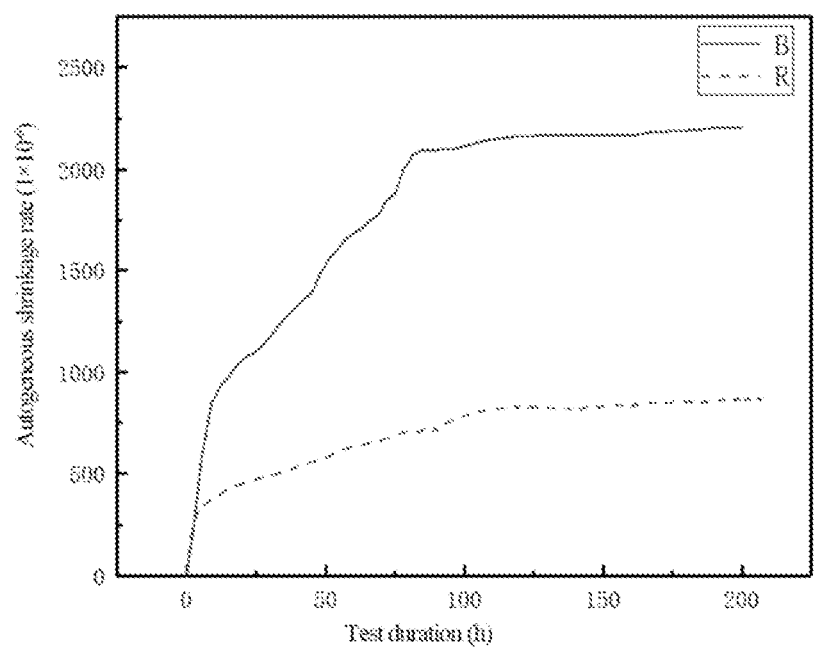
FIG. 18 shows autogenous shrinkage development curves of the UHPC with waste brick powder prepared in Embodiment 2 and that of a UHPC of benchmark group.

The curves of the autogenous shrinkage rate of the UHPC with waste brick powder and the benchmark UHPC of the two groups are shown in FIG. 18, and the shrinkage rates of the two groups of specimens at some time points are shown in Table 5.

TABLE 5

Autogenous shrinkage rate of the two groups of specimens at some time nodes ($1 \times 10^{-6}$)

| | Test duration (h) | | | | |
|---|---|---|---|---|---|
| | 6 | 24 | 72 | 84 | 168 |
| B | 633 | 1,093 | 1,850 | 2,090 | 2,183 |
| R | 348 | 468 | 673 | 705 | 848 |

Analysis combined with FIG. 18 and Table 5 shows that the slope of the autogenous shrinkage curve is relatively large and the shrinkage develops rapidly from 0 to 6 h in both groups of specimens, at this stage the cement hydration reaction is intense, the skeleton has not yet been formed inside the UHPC, new material is continuously generated inside the slurry and water is continuously consumed, which reduces the macroscopic volume of the material; at the time of 6-84 h the slope of the curve starts to decrease and the autogenous shrinkage grows slowly, at this time the skeleton starts to form inside the UHPC, which reduces the development of shrinkage to a certain extent and the shrinkage growth starts to grow slowly. At 84 to 200 h the autogenous shrinkage curve of UHPC is basically stable and the autogenous shrinkage stops growing, at this point the UHPC has completely hardened inside and outside and has developed the strength to resist autogenous shrinkage. It can be seen that the autogenous shrinkage of both groups of materials occurs mainly in the first 3.5 d or so, after which the autogenous shrinkage basically stops growing. The slope of the autogenous shrinkage curve of UHPC with waste brick powder compared to the benchmark UHPC is the same during the first 6 h, and the autogenous shrinkage of both grows at the same rate. The slope of the autogenous shrinkage curve of UHPC with waste brick powder at 6-84 h is smaller compared to that of the benchmark UHPC, proving that the autogenous shrinkage of UHPC with waste brick powder develops slowly compared to that of the benchmark UHPC. In terms of the final value of autogenous shrinkage, the partial replacement of cement by brick powder greatly reduces the final value of autogenous shrinkage of UHPC, with a 61.2% reduction in final autogenous shrinkage in Group R compared to that of Group B. The UHPC with waste brick powder offers better resistance to autogenous shrinkage relative to the benchmark UHPC.

(5) Drying Shrinkage

Figure 19:
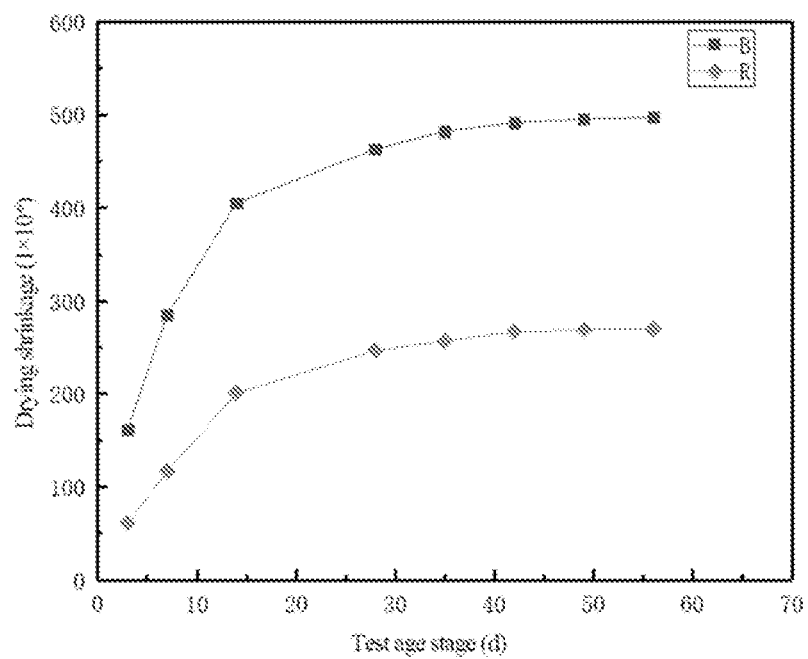
FIG. 19 shows drying shrinkage curves of the UHPC with waste brick powder prepared in Embodiment 2 and that of the UHPC of benchmark group.

The drying shrinkage curves for both groups of UHPC developed with the age of the test are shown in FIG. 19 and the drying shrinkage values for the specimens at selected time points are shown in Table 6.

TABLE 6

Drying shrinkage rate of the two groups of specimens at some time nodes ($1 \times 10^{-6}$)

| | Test age (d) | | | | | |
|---|---|---|---|---|---|---|
| | 3 | 7 | 14 | 28 | 42 | 56 |
| B | 162 | 285 | 405 | 463 | 491 | 497 |
| R | 61 | 117 | 201 | 247 | 267 | 270 |

Analysis combined with FIG. 19 and Table 6 shows that the drying shrinkage of the specimens in both groups develops rapidly before the age of 14 d. After the age of 14 d, the drying shrinkage increases slowly and reaches a general stable level at the age of 42 d. The drying shrinkage of UHPC in group R is reduced by 45.7% at 56 d compared to that of group B. The reasons for this are: on the one hand, the particle size of waste brick powder is smaller than that of cement, which can be filled between particles of cement, refining the pore structure of UHPC and inhibiting the drying shrinkage to a certain extend. On the other hand, the waste brick powder with porous structure absorbs part of the water and releases some of the adsorbed water when the UHPC is in a relatively dry environment, thereby reducing the loss of water and consequently reducing the drying shrinkage. The analysis results of groups B and R show that the drying shrinkage values of the specimens in both groups account for 93.10% and 92.6% of the drying shrinkage values of the whole test age, respectively, and the drying shrinkage of UHPC mainly occurs before the age of 28 d. The shrinkage of UHPC is mainly autogenous shrinkage and drying shrinkage, in which the drying shrinkages of the specimens of both groups account for 18.5% and 17.2% of the whole shrinkage respectively.

(6) Microscopic Test

Figure 20:
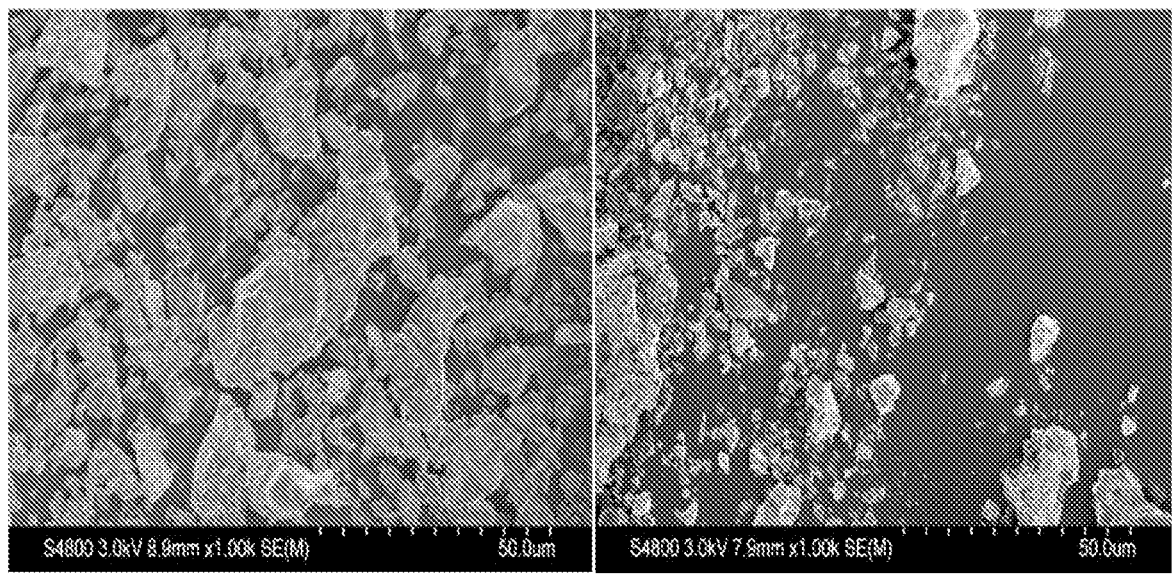
FIG. 20 shows scanning electron microscope (SEM) images of cement and brick powder in the UHPC with waste brick powder prepared in Embodiment 2, with a left picture being cement and a right picture being brick powder.

FIG. 20 shows the cement and brick powder at 1,000 times magnification, where the cement is shown on the left and the brick powder on the right. The picture on the left shows that the cement particles are relatively uniform in size and shape, with a few particles occasionally adhering together to form relatively large clumps, while the picture on the right shows that the overall particle size of the brick powder is smaller than that of the cement particles after physical stimulation (ball milling for 45 min), and is more irregular in shape and has a larger specific surface area. In the left part of the diagram on the right, a single brick powder particle larger than 50 μm can be seen with more fine pores on its surface. It is the presence of some of these particles that absorbs a small amount of water used for cement hydration reactions in the early stages, causing a reduction in early strength and a low degree of reaction between brick powder and water, after which the difference in relative humidity around the brick powder inside the UHPC causes this absorbed water to be released again, forming an internal conservation effect that to some extent shortens the 28 d strength difference between ordinary UHPC and UHPC with waste brick powder.

Figure 21:
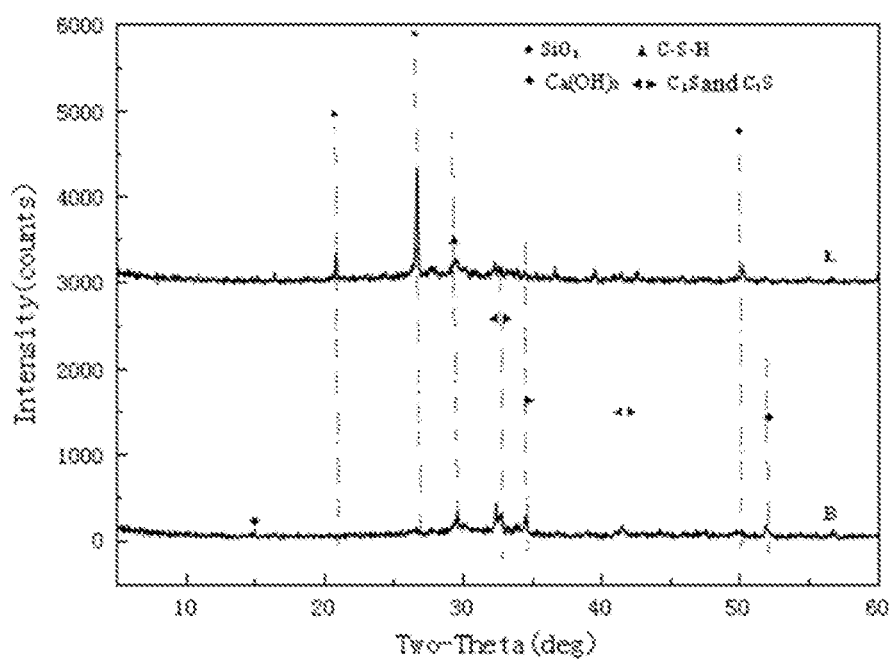
FIG. 21 shows test results of X-ray Diffraction (XRD) of the UHPC with waste brick powder prepared in Embodiment 2 and that of the UHPC of benchmark group.

The XRD test results are illustrated in FIG. 21, from which it can be seen that the main crystal phases measured are $SiO_2$, unhydrated cement clinker ($C_2S$ and $C_3S$), $Ca(OH)_2$, C—S—H, etc. The peaks around 21° and 27° are silicon dioxide, and it can be seen from the figure that there are almost no peaks present in these two areas in Group B. With the addition of waste brick powder, the relative content of silicon dioxide increases and the peaks become progressively larger. The peak value of C—S—H decreases after the addition of waste brick powder, analyzed as follows: when brick powder is not added, the cement hydrates to produce a large amount of $Ca(OH)_2$, which reacts with other mineral admixtures to produce more C—S—H; however, when brick powder replaces 40% of the cement, the amount of cement is small and the $Ca(OH)_2$ produced by the cement hydration is not enough to react with all the mineral admixtures to produce a sufficient amount of C—S—H. This is also confirmed by the fact that the peak value of $Ca(OH)_2$ disappears with the addition of brick powder in the figure. It is worth noting that $C_2S$ and $C_3S$ are mainly derived from unhydrated cement clinker and the reduction in the peak value of both indicates a sharp reduction in unhydrated cement within the UHPC and an increase in cement utilization following the partial replacement of cement by brick powder, which, combined with the larger peak value of $SiO_2$, can be assumed to be largely replaced by brick powder as a filler cement particle.

Figure 22:
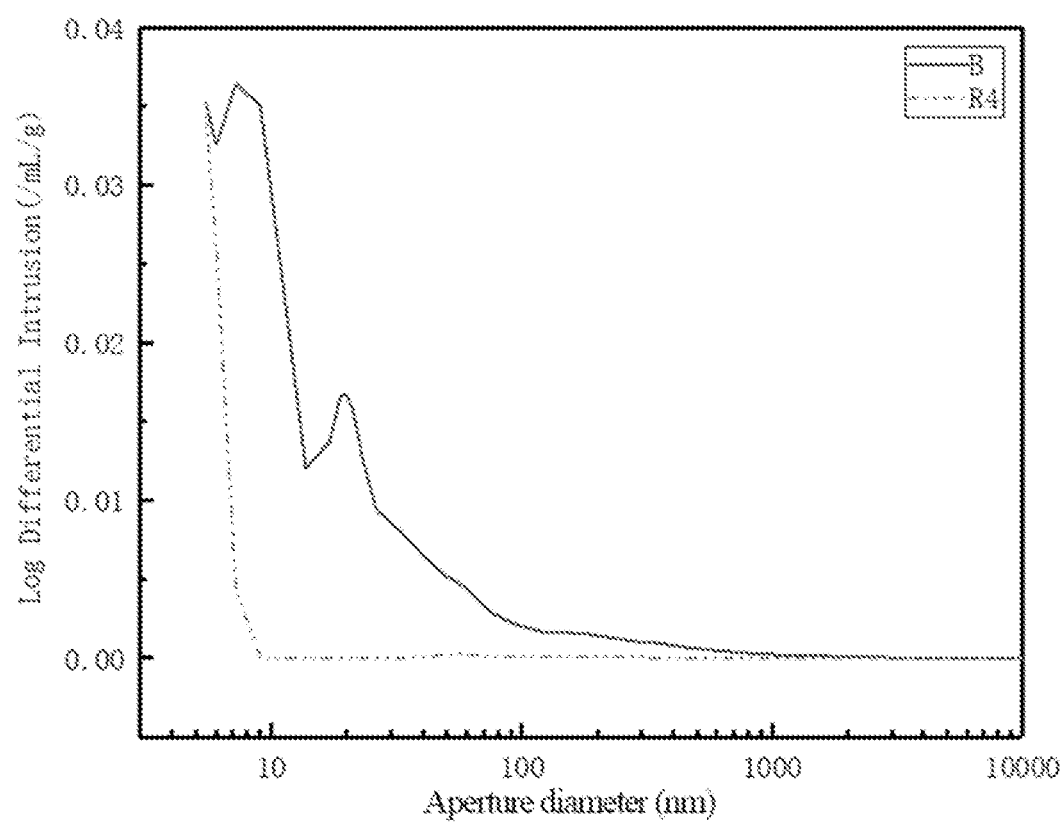
FIG. 22 shows aperture distribution curves of the UHPC with waste brick powder prepared in Embodiment 2 and that of the UHPC of benchmark group.

The aperture distribution curve of the two groups of UHPC specimens is shown in FIG. 22, and the pore structure parameters of the two groups of specimens are shown in Table 7.

TABLE 7

Pore structure parameters of the two groups of specimens

| Group | Porosity (%) | Mean aperture (nm) | Median aperture (nm) | Most probable aperture (nm) | Apparent density (g/mL) |
|---|---|---|---|---|---|
| B | 4.86 | 43.1 | 136.74 | 7.43 | 2.306 |
| R | 4.80 | 16.06 | 5.90 | 5.30 | 2.206 |

As can be seen from FIG. 22, the aperture distribution curve shifts to the left when 40% of cement is replaced by brick powder, indicating that the addition of waste brick powder refines the pore structure of UHPC, resulting in an overall reduction in the aperture within the material. As can be seen from Table 7, the individual pore structure parameters are reduced in Group R compared to that of Group B. The variation in porosity and apparent density is small, while the average aperture, the median aperture and the most probable aperture are highly variable. The most probable aperture is an important feature parameter of the material, representing the aperture corresponding to the maximum peak on the differential distribution curve of the aperture, with the physical meaning being the aperture with the highest probability of occurrence within the material.

Embodiment 3

The technical scheme of the UHPC with waste brick powder of the present embodiment is different from that of Embodiment 2 only in that the proportioning of cement is 350 kg/m$^3$ and the proportioning of waste brick powder is 350 kg/m$^3$.

Results: the 28 d compressive strength of the UHPC with waste brick powder prepared in this embodiment is 147.5 MPa and the values of bending toughness $I_5$, $I_{10}$ and $I_{20}$ are 8.231, 20.025 and 33.149 respectively.

Embodiment 4

The technical scheme of the UHPC with waste brick powder of the present embodiment is different from that of Embodiment 2 only in that the proportioning of cement is 490 kg/m$^3$ and the proportioning of waste brick powder is 210 kg/m$^3$.

Results: the 28 d compressive strength of the UHPC with waste brick powder prepared in this embodiment is 150.9 MPa and the values of bending toughness of $I_5$, $I_{10}$ and $I_{20}$ are 7.536, 13.303 and 17.810, respectively.

Comparative Embodiment 1

The technical scheme of the UHPC with waste brick powder of the present embodiment is different from that of Embodiment 2 only in that the waste brick powder used is waste brick powder that has not been mechanically stimulated and activated.
(1) The waste bricks in the construction waste are sorted, dried and preliminarily crushed into fine particles by jaw crusher;
(2) SM500×500 ball miller is used for the primary ball milling, with a ball milling duration of 15 min;
(3) the brick powder after ball milling is screened, and the microfine particles with a particle size of 0.075 mm are selected, then the waste brick powder is obtained.

Results: the 28 d compressive strength of the UHPC with waste brick powder prepared in this comparative embodiment is 121.3 MPa, and the bending toughness values of $I_5$, $I_{10}$ and $I_{20}$ are 5.135, 10.264 and 21.247, respectively.

The embodiments described above are only a description of the preferred way of the present application and are not intended to limit the scope of the present application. Without departing from the spirit of the design of the present application, all kinds of variations and improvements made to the technical solutions of the present application by persons of ordinary skill in the art shall fall within the scope of protection determined by the claims of the present application.

What is claimed is:

1. A preparation method of an ultra-high performance concrete with waste brick powder, wherein raw materials of the ultra-high performance concrete with waste brick powder comprise, in parts by mass, 35-42 parts of cement, 28-35 parts of brick powder, 10 parts of fly ash, 20 parts of silica fume, 100 parts of grit, 15.6 parts of steel fiber, 30 parts of water reducing agent and 17 parts of water;
the brick powder and the cement are in a total amount of 70 parts;
the preparation method of the ultra-high performance concrete with waste brick powder comprises following steps:
stimulating activity of the brick powder by using a method of mechanically stimulating activity to obtain the waste brick powder; and
preparing ultra-high performance concrete by weighing the raw materials in parts by mass to obtain the ultra-high performance concrete with the waste brick powder; and
the method of mechanically stimulating activity specifically comprises stimulating the activity of the brick powder by using a ball mill to ball mill a brick powder with a particle size of 8-75 micrometers for 45 minutes at a rate greater than 45 revolutions per minute.

2. The preparation method of the ultra-high performance concrete with waste brick powder according to claim 1, wherein the cement is P·O52.5 ordinary portland cement.

3. The preparation method of the ultra-high performance concrete with waste brick powder according to claim 1, wherein the fly ash is first-grade fly ash.

4. The preparation method of the ultra-high performance concrete with waste brick powder according to claim 1, wherein the steel fiber is copper plated steel fiber.

5. The preparation method of the ultra-high performance concrete with waste brick powder according to claim 1, wherein the water reducing agent is polycarboxylate superplasticizer, and a water reducing rate of the water reducing agent is greater than 30%.

6. An ultra-high performance concrete with waste brick powder prepared by using the preparation method according to claim 1.

* * * * *